United States Patent
Chong et al.

(10) Patent No.: US 6,847,382 B2
(45) Date of Patent: Jan. 25, 2005

(54) METHOD USED TO ZOOM IN SELECTIVE PLOT AREA IN DISPLAY AND A PLOTTING CALCULATOR APPLIED THE LIKE

(75) Inventors: Gaai-Ting Chong, Taipei (TW); Pei-Chih Chen, Taipei (TW)

(73) Assignee: Kinpo Electronics, Inc., Taipei (TW)

(*) Notice: Subject to any disclaimer, the term of this patent is extended or adjusted under 35 U.S.C. 154(b) by 228 days.

(21) Appl. No.: 10/058,757

(22) Filed: Jan. 30, 2002

(65) Prior Publication Data
US 2003/0142117 A1 Jul. 31, 2003

(51) Int. Cl.$^7$ ................................................. G09G 5/00
(52) U.S. Cl. ...................... 345/660; 345/661; 345/665; 345/666; 345/441; 345/622
(58) Field of Search ................. 345/660, 661, 345/665, 666, 441, 622

(56) References Cited

U.S. PATENT DOCUMENTS

| | | | |
|---|---|---|---|
| 4,800,510 A | * | 1/1989 | Vinberg et al. ............. 345/440 |
| 5,760,785 A | * | 6/1998 | Barber et al. ............... 345/440 |
| 5,963,216 A | * | 10/1999 | Chiarabini et al. ......... 345/660 |

OTHER PUBLICATIONS

Pual L. Schlieve, Autocad release 11, 1991, Wordware Publishing, Inc., pp. 292–297, and 303–306.*

* cited by examiner

Primary Examiner—Matthew C. Bella
Assistant Examiner—Manucher Rajmjoo
(74) Attorney, Agent, or Firm—Troxell Law Office PLLC

(57) ABSTRACT

This invention relates to a method used to zoom in selective plot area in display, which method is inserted an inserted box into the display screen of a display device, and said inserted box can be removed to said display screen anywhere and the plot covered within said inserted box can be zoomed in according to predetermined zoom rate or zoom rate immediately set.

Said method of this invention is applicable to a plotting calculator so that by way of keying in the keys of said plotting calculator the user can precisely and quickly select the plot area going to zoom in display.

10 Claims, 3 Drawing Sheets

METHOD USED TO ZOOM IN SELECTIVE PLOT AREA IN DISPLAY AND A PLOTTING CALCULATOR APPLIED THE LIKE

BACKGROUND OF THE INVENTION

1. Field of the Invention

The present invention relates to a method used to zoom in selective plot area in display, and more particularly to the method capably used in plotting calculator to zoom in any plot area selected in display.

2. Description of Related Art

The general plotting calculator sold in market, such as CASIO's product, must firstly remove an optical point displayed in display screen onto a starting point of an area going to be zoomed in when proceeding to zoom in partial area of plot shown in display of a plotting calculator, then to key in the enter key to confirm the input data, and secondly further remove the optical point, at this moment a rectangle box shown, to a terminate point in where a rectangle area shown the partial area of plot to be zoomed in is built, therefore, the selectively area of plot will be then zoomed in and shown a more clear plot after the enter key is keyed in again to execute the zoomed in plot operation.

But according to the method mentioned above, resulted from using visual operation to approximatively position that starting point and terminate point of rectangle box as a zoomed in area, the way how to precisely choose the starting point and terminate point of a zoomed in area to be selectively shown is become a serious problem to user. User must repeat the selective operation to zoom in plot again if the area already zoomed in is just not the area going to be zoomed in to user's want. Therefore, it is unsatisfactory to general user and more inconvenient to people who is unfamiliar the function to zoom in selective plot in general plotting calculator.

SUMMARY OF THE INVENTION

This present invention is disclosed to provide general plotting calculator with the function of capably enlarging the selective plot area precisely and conveniently.

The primary objective of this present invention is to provide an operate method to user who can quickly and precisely zoom in the selective plot area going to be zoomed in.

The another objective of this present invention is to provide a plotting calculator which is convenient to user to precisely zoom in the plot area selected by user.

BRIEF DESCRIPTION OF THE DRAWINGS

The invention is description in detail with reference to the following drawings, wherein like numerals represent like elements.

DETAILED DESCRIPTION OF THE PREFERRED EMBODIMENT

Figure 1:
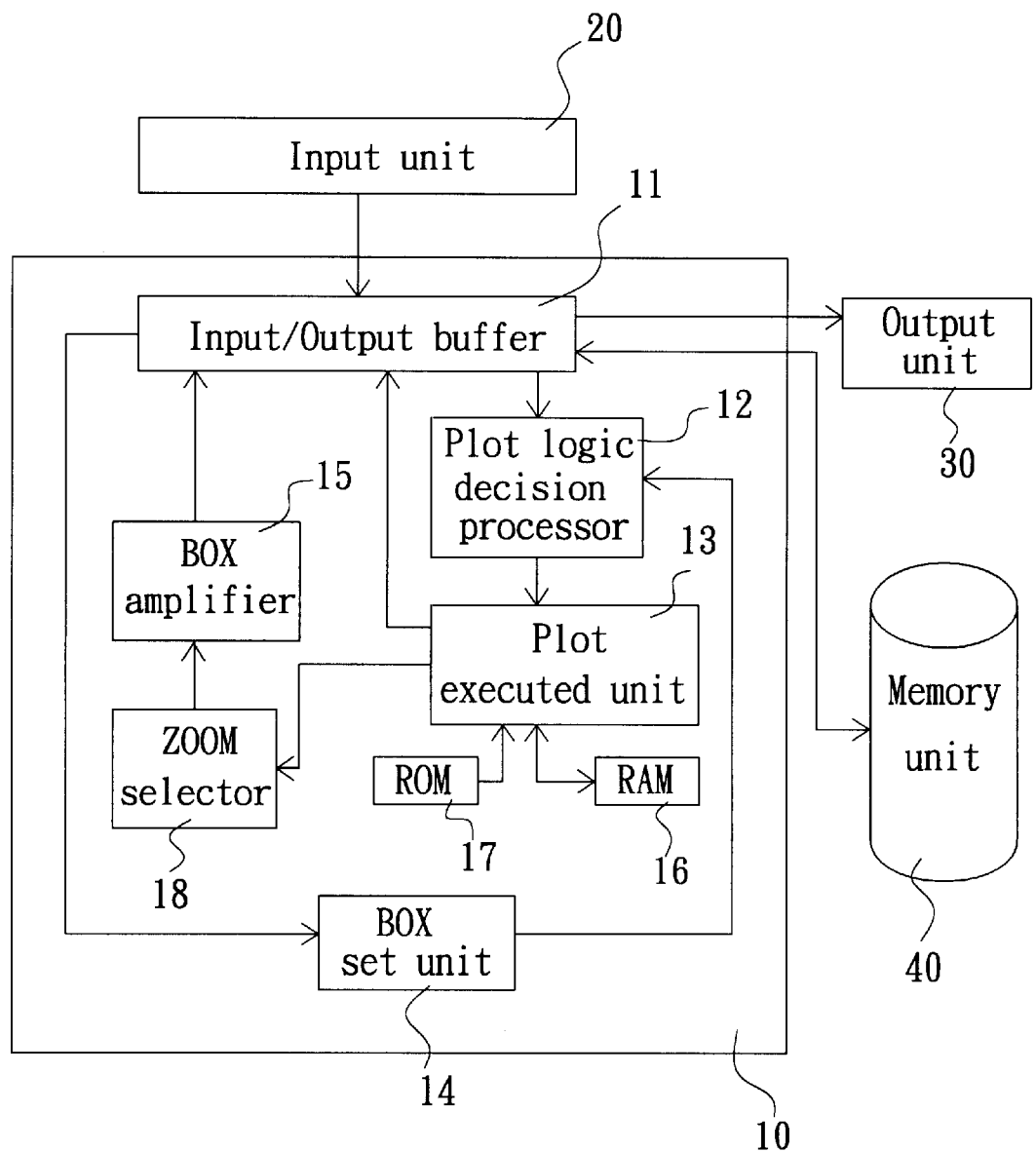
FIG. 1 is a structural block diagram of the plotting calculator of this present invention.

Referring to FIG. 1, a plotting calculator, which is one of embodiments capably to execute the operate method of this invention, comprises a CPU (Central Processing Unit) 10 respectively connected to an input unit 20, an output unit 30 and memory unit 40; said CPU 10 has an input/output buffer 11 which is also connected to a plot logic decision processor 12, a plot executed unit 13, a BOX set unit 14 and a BOX amplifier 15 respectively; said plot executed unit 13 is connected to a RAM 16, a ROM 17 and a ZOOM selector 18; and said BOX amplifier 15 is connected to said ZOOM selector 18 too.

User can operate those keys of input unit 20 to key in some plotting data, and, after executed and processed by said plot logic decision processor 12 and said a plot executed unit 13, a plot is then displayed on LCD (liquid crystal display) of said output unit 30. The plot drawn by user can save to said memory unit 40 if the user wants, and the plot processed by said ZOOM selector 18 can zoom in or zoom out also by way of user's keying in some keys of input unit 20. Those techniques mentioned above to build a plot, save the plot data and zoom in or zoom out entire plot are prior art known to all. The trait of this disclosed invention is made use of operating those keys of said input unit 20 to key in some information data, and through controlled by said BOX set unit 14 to choose the shape, size and displacement speed of a rectangle box area going to be zoomed in and choose the zoom rate to zoom in the selected plot, then after executed and processed by said plot logic decision processor 12, said a plot executed unit 13, said ZOOM selector 18 and said BOX amplifier 15, a box is capably inserted into the plot in advance displayed on LCD of said output unit 30 and the box can be precisely removed to an area going to be zoomed in also and zoom in the plot covered within the box.

Figure 2:
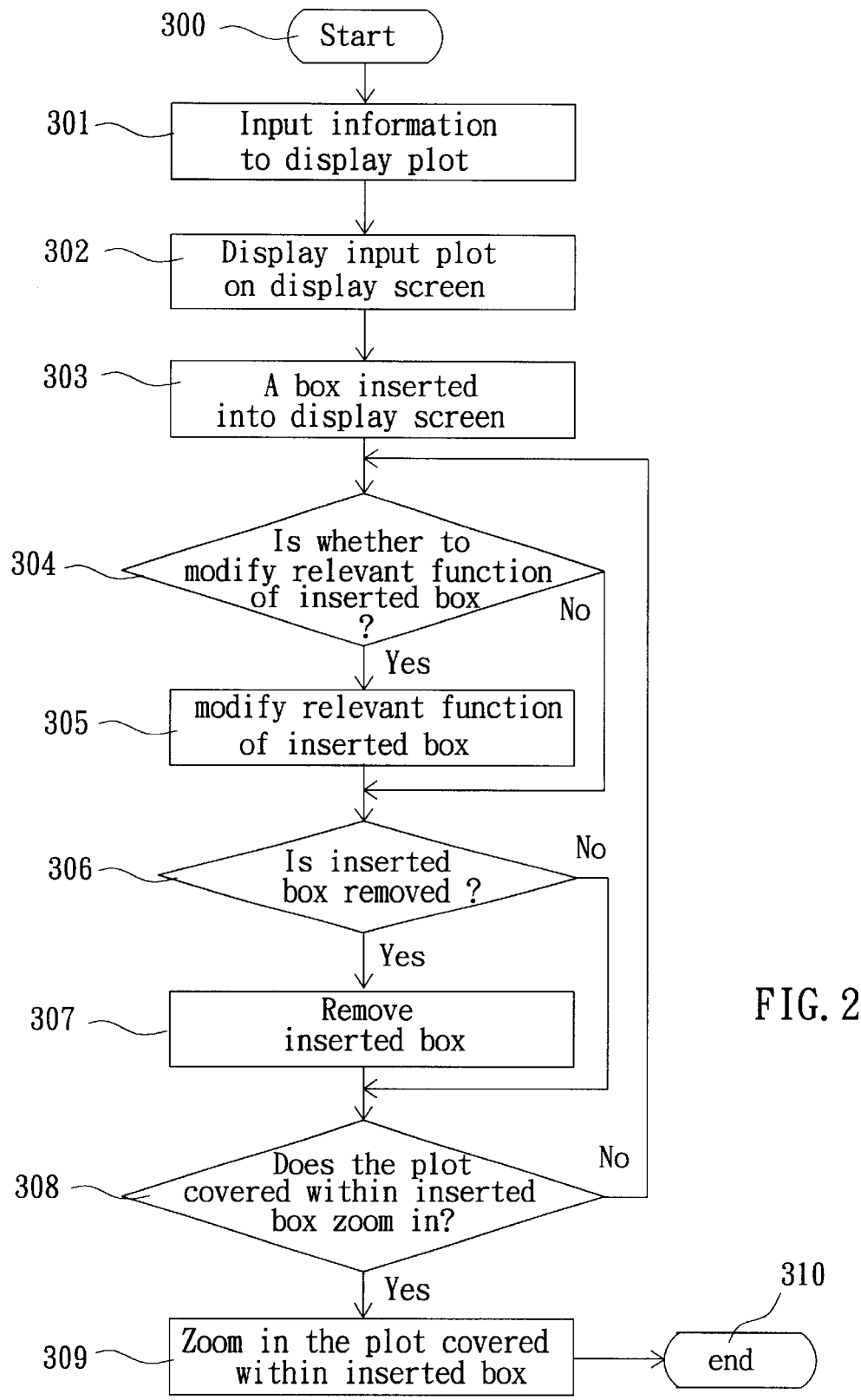
FIG. 2 is a flow chart to carry into the operate method of this present invention.
Figure 3A:
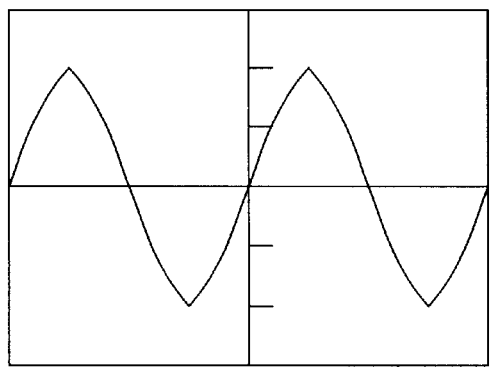
FIG. 3 is an example's illustration diagram shown a plot area selected for enlargement.
Figure 3B:
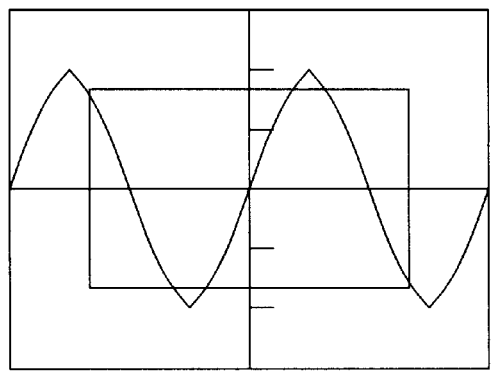
Figure 3C:
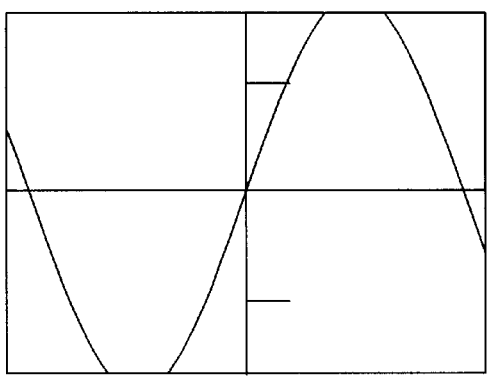

Referring to FIG. 1, FIG. 2 and FIG. 3, for conveniently illustrating the operate method of this invention a plotting calculator is taken as an embodiment to carry into the like. The method used to zoom in the selected plot of this invention comprises the following steps:

301 CPU 10 has detected the information to display relevant plot transferred from said input unit 20;

302 CPU 10 executes plot displaying operation to display the input plot on display screen (as shown in FIG. 3A);

303 CPU 10 has detected the information to have a box inserted and executes box inserted operation to insert a box into the display screen (as shown in FIG. 3B);

304 to decide whether or not CPU 10 has detected the information to modify the shape, size, displacement speed and zoom rate of said inserted box transferred from said input unit 20;

305 is the decision value in step 304 detected by CPU 10 is positive then CPU 10 executes modifying operation to modify the shape, size, displacement speed and zoom rate of said inserted box; otherwise, to neglect this step and go to step 306;

306 to decide whether or not CPU 10 has detected the information to remove said inserted box transferred from said input unit 20;

307 if the decision value in step 306 detected by CPU 10 is positive then CPU 10 executes displacement operation to remove said inserted box, otherwise, to neglect this step and go to step 308;

308 to decide whether or not CPU 10 has detected the information to zoom in the plot covered within said inserted box transferred from said input unit 20; if the decision value detected by CPU 10 is negative then go to step 304;

309 if the decision value in step 308 detected by CPU 10 is positive then CPU 10 executes zoom operation to zoom in the plot covered within said inserted box and display the zoomed in plot on display screen (as shown in FIG. 3C).

In step 302 to execute a plot displaying operation of this disclosed invention comprises to display certain plot which is immediately accorded to plotting software program to build said plot and transferred from input unit 20, and to display this kind of plot saved in advance and output from memory unit 40. By the method disclosed in this invention, the inserted box to zoom in partial plot selected directly displays on the plot area going to be zoomed in so that it is no longer necessary for user to approximatively choose a rectangle box selective for enlargement on display screen first as before. The user according to the position of said inserted box of this invention can directly see the plot area selected for zoom in is correct or incorrect to improve the drawback of prior art which is hardly known whether the position of rectangle box selective for enlargement is incorrect until finishing building a rectangle box on display screen. The user can intentionally remove said inserted box of this invention to any properly selective position not as before necessary for repeatedly several times. Therefore, by the method of this invention used to zoom in selective plot area in display can obviously reduce some operated steps to user and improve efficiency.

Under zooming in selective plot process of this invention, the shape (such as square, circle and rectangle), size, displacement speed and zoom rate of said inserted box can be modified at any time. If it is unnecessary to modify said inserted box of this invention, the last value of preceding operation of this invention is taken as a threshold value.

The method used to zoom in selective plot area in display of this invention is applicable to carry type of consumable electronic products (such as portable telephone or PDA) or other products with liquid crystal display (LCD).

The scope of this disclosed invention is not limited to the embodiment illustrated as above. Which scope explained and defined by claims may include all changeable equivalents more particularly only changed in easy amendment or variation.

What is claimed is:

1. A method to zoom a selected area of a display of an electronic device, which comprises the steps of:

a) detecting information to display an electronic image, the information being transferred from an input unit to a central processing unit connected to the input unit;

b) executing an image displaying operation utilizing the central processing unit and displaying the electronic image on a display screen of an output unit connected to the central processing unit;

c) detecting information requesting that a box be inserted, the information being transferred from the input unit to the central processing unit;

d) executing a box insertion operation to display the box on the display screen utilizing the central processing unit;

e) performing an operation to determine whether the central processing unit has received information transferred from the input unit to delete the box;

f) when an outcome of the performing step e) is negative, proceeding directly to a performing step g), and when an outcome of the performing step e) is affirmative, executing a displacement operation to remove the box utilizing the central processing unit;

g) performing an operation to determine whether the central processing unit has received information to zoom the selected area located within the box; and h) when an outcome of the performing step g) is negative, proceeding directly to the performing step d), and when an outcome of the performing step g) is affirmative, executing a zoom operation to zoom the selected area located within the box and displaying an enlarged version of the selected area on the display screen.

2. The method according to claim 1, wherein the executing step d) includes the steps of:

d1) performing an operation to determine whether the central processing unit has received information to modify a shape of the box transferred from the input unit; and d2) when an outcome of the performing step d1) is affirmative, executing a modifying operation to modify the shape of the box, and when an outcome of the performing step d1) is negative, proceeding directly to a performing step f).

3. The method according to claim 1, wherein the executing step d) includes the steps of:

d1) performing an operation to determine whether the central processing unit has received information to modify a size of the box transferred from the input unit; and d2) when an outcome of the performing step d1) is affirmative, executing a modifying operation to modify the size of the box, and when an outcome of the performing step d1) is negative, proceeding directly to a performing step f).

4. The method according to claim 1, wherein the executing step d) includes the steps of:

d1) performing an operation to determine whether the central processing unit has received information to modify a displacement speed of the box transferred from the input unit; and d2) when an outcome of the performing step d1) is affirmative, executing a modifying operation to modify the displacement speed of the box, and when an outcome of the performing step d1) is negative, proceeding directly to a performing step f).

5. The method according to claim 1, wherein the executing step d) includes the steps of:

d1) performing an operation to determine whether the central processing unit has received information to modify a zoom rate of the box transferred from the input unit; and d2) when an outcome of the performing step d1) is affirmative, executing a modifying operation to modify the zoom rate of the box, and when an outcome of the performing step d1) is negative, proceeding directly to a performing step f).

6. The method according to claim 1, wherein the executing step b) includes displaying the electronic image on the display as the electronic image is created by a plotting software program.

7. The method according to claim 1, wherein the executing step b) includes transferring information from a memory unit connected to the central processing unit to display the electronic image on the display when the electronic image is stored in the memory unit.

8. The method according to claim 1, wherein the central processing unit of the detecting information step a) includes:

a) input/output buffers connected to a plot logic decision processor, a plot executed unit, a BOX set unit, and a BOX amplifier;

b) the plot executed unit is connected to a read access memory, a read only memory, and a zoom selector; and c) the BOX amplifier is connected to the zoom selector.

9. The method according to claim 1, wherein the input unit of the detecting information step a) includes plurality of input keys.

10. The method according to claim 1, wherein the display screen of the executing a image displaying operation step b) is a liquid crystal display.

* * * * *